_United States Patent Office_

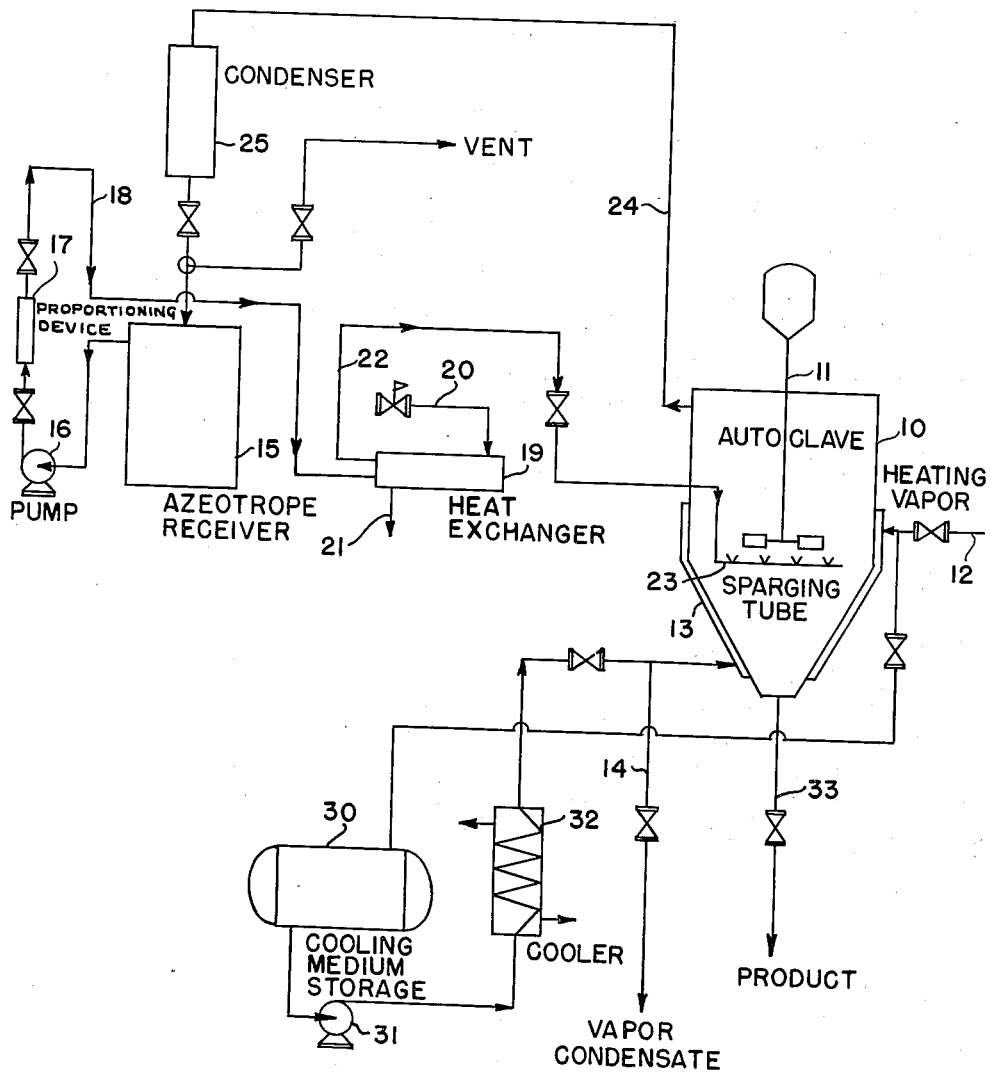

3,041,298
Patented June 26, 1962

3,041,298
AZEOTROPIC ESTERIFICATION OF PHENOLIC RESINS
Lawrence W. Berglund, Minneapolis, Minn., Erwin L. Capener, China Lake, Calif., and Stuart A. Harrison, Minneapolis, Minn., assignors to General Mills, Inc., a corporation of Delaware
Filed May 3, 1955, Ser. No. 505,786
7 Claims. (Cl. 260—19)

The present invention relates to a novel process of esterifying phenol-formaldehyde resins and is especially directed to the esterification of high molecular weight phenol-formaldehyde resins which under ordinary conditions of esterification tend to gel.

In the esterification of phenol-formaldehyde resins, particularly with unsaturated higher fatty acids, there is the possibility of polymerization either of the unsaturated fatty acids used for esterification but more particularly of the unsaturated fatty acid esters of the phenol-formaldehyde resin. The polymerization of the unsaturated fatty acid groups as a result of the high temperatures employed for esterification, may result in gelation.

It has now been discovered that by means of the present invention it is possible to not only speed up the rate of esterification but also to avoid the dangers of gelation encountered under ordinary esterification conditions.

It is, therefore, an object of the present invention to provide a novel process of esterifying phenol-formaldehyde resins under conditions which will speed up the reaction and reduce the possibility of gelation.

The invention is applicable to phenol-formaldehyde resins in general, resins derived either from phenol itself or from alkyl or aryl substituted phenols such as the phenols containing alkyl substituents of from 1–8 carbon atoms as well as aryl phenols such as ortho- and para-phenyl-phenol. Typical alkyl-substituted phenols include cresol, xylenol, ethylphenol, isopropylphenol, tertiary-butylphenol, tertiary-amylphenol, hexyl, heptyl and octyl phenols. The alkyl substituents can either be straight or branched chain.

The acids employed for esterification of the phenol-formaldehyde resin can be saturated or unsaturated higher fatty acids, rosin acids or polybasic acids such as the aliphatic dibasic acids containing from 5–10 carbon atoms including glutaric, adipic, suberic, azelaic, pimelic and sebacic acids. Aromatic polybasic acids such as terephthalic and isophthalic acids can also be used. The invention, however, is particularly adapted to the use of higher fatty acids which are sufficiently unsaturated to have an iodine value of 100 or more, preferably an iodine value in excess of 120. These esters of high molecular weight phenol-formaldehyde resins have desirable properties as coatings. The preferred esters of this type are disclosed in co-pending application of David Aelony, Serial No. 425,749, filed April 26, 1954, and application Serial No. 281,039, filed April 7, 1952, now abandoned.

It is in the production of these preferred esters of the phenol-formaldehyde resins that the problem of gelation occurs and, accordingly, it is toward the production of esters of this type that the present invention is particularly adapted although it can also be used for the production of other esters as pointed out previously in which event it does speed up the reaction although the problem of gelation may not be present.

The invention involves the reaction of phenol-formaldehyde resins with various acids at an elevated temperature while an azeotroping agent is being circulated through the reaction mixture at a certain minimum rate. The invention is applicable to the use of any azeotroping agent in this circulation, but for the purpose of simplicity the invention will be described with particular reference to the use of xylene, an azeotroping agent which is particularly suited for this reaction. It has been discovered that when xylene vapor is circulated through the reaction mass at a rate of at least 2 cc. (measured as liquid) per minute per 100 grams of resin, the rate of esterification is materially increased and it is possible to carry out the esterification at the ordinary preferred temperatures of 200–300° C. without danger of gelation. Considerable variations are possible in the rate of circulation of the xylene vapors through the reaction mixture, but 2 cc. per minute per 100 grams of resin represents a minimum. A preferred range is from 5 cc. up to the rate at which excessive mist entrainment is encountered in the particular equipment employed. This again is determined by the ratio of the surface of the reaction mixture to the weight thereof. In generally available esterification equipment, rates of as much as 10 cc. may be employed without excessive entrainment loss. By employing a special esterifier having a large surface area for the reaction mixture in relation to the weight of the reactants, the rate may be materially increased up to 20 cc. or more. Higher rates can also be employed but generally the increase in esterification rate obtained at these higher rates does not warrant the employment of the special equipment needed. It is, of course, apparent that at higher rates of circulation entrainment separators and the like may be employed if desired in order to reduce the amount of entrainment.

Considerable variation is likewise possible in the manner in which the azeotroping agent is employed. In small laboratory preparations the xylene may be included directly in the reaction mixture and sufficient heat may be applied to the reaction vessel in order to vaporize xylene therefrom and to reflux the xylene while permitting the water of reaction to be separated off and removed from the sphere of the reaction. In larger scale applications, however, it is difficult to transfer sufficient heat to the body of a reaction mixture by means of the usual heating jacket on a kettle and, accordingly, it is preferred to heat the xylene before introducing it into the reaction vessel. There is considerable variation in the amount of heat which may be added. Under some circumstances it may be desirable to merely heat the xylene to approximately its boiling point, which may be considerably below the reaction temperature. The remaining heat required to vaporize the xylene can then be added in the reaction vessel. A preferred procedure, however, is to actually vaporize the xylene outside of the reaction vessel and then bubble it through the reaction mixture in which event the heat of vaporization has already been applied externally of the kettle and the heat required to maintain the reaction mixture at temperature is all that is required to be transferred by means of the jacket on the kettle.

The drawing illustrates diagrammatically an apparatus in which the invention may be carried out on a commercial scale. In general the apparatus illustrates an operation in which the esterification is conducted in an autoclave and in which the azeotroping agent is introduced into the autoclave in a heated condition (either as liquid or vapor), the azeotrope vapor is removed and condensed and the water of esterification is removed from the azeotrope before it is recycled.

The operation is conducted by charging the autoclave 10 with the reactants, namely, the phenolic resin, the fatty or other acid and the catalyst, if any is used. The autoclave is then closed and the agitator 11 started. Heating vapor preferably in the form of a mixture of diphenyl and diphenyl oxide, sold commercially as Dowtherm, is introduced through line 12 into a jacket 13 surrounding a conical bottom of the autoclave. Heating vapor condensate is removed from the jacket through line 14.

Azeotroping agent from receiver 15 is withdrawn by means of pump 16 which passed through the proportioning device 17. The proportioning device may be any suitable device of this type which will permit the passage of a measured quantity of the azeotroping agent. The measured quantity of the azeotroping agent passes through line 18 into heat exchanger 19 which may be suitably heated by means of steam introduced into line 20, the condensate from which is removed through line 21. In the heat exchanger the azeotroping agent may be heated to any desired degree. Since it is desired to maintain a high rate of circulation of the azeotroping agent through the autoclave, it is preferred to vaporize the azeotroping agent in the heat exchanger and to superheat the vapors if necessary so that they will have a temperature approximating the temperature of reaction in the autoclave. The heated azeotrope is withdrawn from the heat exchanger through line 22 and introduced into a sparging tube below the liquid level in the autoclave. The azeotroping agent vapors rising through the reaction liquid carry water of reaction with them and this mixture of vapors is withdrawn from the autoclave through line 24 into condenser 25. The condensed liquid is returned to azeotrope receiver 15 in which any liquid water may be separated by phase separation in any suitable manner. It is, of course, possible to operate the condenser 25 at such a temperature as to condense the xylene without condensing the water vapors and these vapors may then be vented to atmosphere.

Upon completion of the reaction it is desirable to cool the reaction mixture promptly so as to avoid subjecting the body of liquid to the elevated temperature for too extended a period of time. When it is desired to cool, the heating vapor line is closed as well as the vapor condensate line. Cooling medium which likewise may be Dowtherm is withdrawn from cooling medium storage tank 30 by means of pump 31 and is passed through cooler 32 into jacket 13. The cooling is carried on until the reaction mixture has reached the temperature at which it can be exposed to the air. The reaction product is then withdrawn through line 33 at the bottom of the autoclave.

The quantity of xylene actually dissolved in the reaction mixture will regulate the maximum reaction temperature. The amount of xylene actually dissolved in the reaction mixture, however, is not the significant factor. The significant factor is the rate at which the xylene vapors are passed through the reaction mixture and served to remove water therefrom.

The reaction may be carried out either in the presence or the absence of an esterification catalyst. In the absence of an esterification catalyst usually a higher temperature is preferred. Any of the customary esterification catalysts may be employed such as zinc stearate, zinc acetate, cobalt naphthenate, nickel acetate and lead acetate. The preferred esterification catalysts, however, are the phosphite esters such as triphenylphosphite, disclosed in Harrison Patent No. 2,622,071.

Example 1

A p-t-butyl resin was prepared in a stirred autoclave. The charge ratio was as follows:

| | Pts. |
|---|---|
| p-t-Butyl phenol | 1200 |
| Formalin (37%) | 650 |
| Oxalic acid (anhydrous) | 8 |

The materials were charged to an autoclave and heated to 160° C. for five hours. The reaction mass was cooled and then stripped of water and low boiling by-products by heating to 275° C. at 5 mm. pressure. It was cooled by pouring onto Dry Ice. 200 grams of the above resin, 432 grams of soybean fatty acid, 5 grams of triphenylphosphite and sufficient xylene to give a reaction temperature of 260° C. were placed in a 1 liter three-necked round bottom flask equipped with mechanical stirrer, xylene inlet tube containing thermometer, side arm condenser with water separator and a heating mantle. A calibrated Zenith pump was used to return the xylene to the reaction mixture at the desired rate. The heat was adjusted so that the xylene was vaporized at the same rate that it was returned.

A series of esterifications were conducted under these conditions with varying rates of xylene return to the reaction vessel. The following table indicates the variation in the time period required at various xylene reflux rates:

| Xylene rate, cc./min./100 g. resin | Hours required to reach 90% conversion |
|---|---|
| 2.5 | 10 |
| 5.0 | 6–7 |
| 10.0 | 5–6 |
| 15.0 | 4 |

Example 2

The reactants were the same as in Example 1 with the exception that zinc stearate was employed in the same quantity as catalyst. The results obtained are indicated in the following table:

| Xylene rate, cc./min./100 g. resin | Hours required to reach 80% conversion |
|---|---|
| 2.5 | <11 |
| 5.0 | < 8 |
| 10.0 | 7 |

Example 3

A phenol-formaldehyde resin was prepared as follows: phenol (1800 g.) and oxalic acid (10 g.) were charged to a 5 liter, three-necked flask equipped with mechanical stirrer, reflux condenser, and dropping funnel. The mixture was heated to 100° C. and the formalin added over a period of 40 minutes. The stirred mixture was held under slow reflux for seven hours. At the end of this time the water, unreacted phenol, bis-phenol, etc. were distilled off by heating under vacuum to a final temperature of 295° C. and pressure of 1 mm. The reaction mixture was cooled by pouring over Dry Ice. This resin was esterified in the same type of equipment described for Example 1. The following materials were charged to the flask:

| | G. |
|---|---|
| Phenol-formaldehyde resin | —150 |
| Soybean oil acid | —400.5 |
| Zinc stearate | —6 |
| Xylene (adjusted to give desired reflux temp.) | |

The esterification reaction was conducted at 235° C. The results are indicated in the following table:

| Xylene rate, cc./min./100 g. resin | Hours required to reach 90% conversion |
|---|---|
| 2.5 | 22 |
| 9 | 20 |

These examples show a definite increase in the rate of esterification as the rate of xylene reflux is increased. In Examples 2 and 3 the results are not as phenomenal as they are in Example 1 and in some extent this is due to the fact that zinc stearate is definitely a far innferior esterification catlayst to the triphenylphosphite employed in Example 1.

We hereby claim as our invention:

1. Process of esterifying an acid catalyzed phenol-formaldehyde resin which comprises reacting the resin with an organic carboxylic acid having at least 5 carbon atoms at a temperature within the approximate range of 200–300° C. adding vapors of an inert entrainer for the water of reaction into the reaction mixture at a rate of at least 2 cc. (measured as liquid) per minute per 100 grams of resin, said vapors being added at a temperature above the boiling point of said entrainer, withdrawing said vapors with the entrained water of esterification from the reaction vessel, condensing said entrainer and water, separating said water and entrainer and vaporizing said entrainer, and re-adding said vapors into the reaction mixture.

2. Process of esterifying an acid catalyzed phenol-formaldehyde resin which comprises reacting the resin with an organic carboxylic acid having at least 5 carbon atoms at a temperature within the approximate range of 200–300° C. adding vapors of an inert entrainer for the water of reaction into the reaction mixture at a rate within the approximate range of 2 to 20 cc. (measured as liquid) per minute per 100 grams of resin said vapors being added at a temperature above the boiling point of said entrainer, withdrawing said vapors with the entrained water of esterification from the reaction vessel, condensing said entrainer and water, separating said water and entrainer and vaporizing said entrainer, and re-adding said vapors into the reaction mixture.

3. Process of esterifying an acid catalyzed phenol-formaldehyde resin with an unsaturated higher fatty acid which comprises heating the mixture of resin and fatty acid in the presence of an esterification catalyst to a temperature within the approximate range of 200–300° C. adding vapors of an inert entrainer for the water of reaction into the reaction mixture at a rate of at least 2 cc. (measured as liquid) per minute per 100 grams of resin, said vapors being added at a temperature above the boiling point of said entrainer, withdrawing said vapors with the entrained water of esterification from the reaction vessel, condensing said entrainer and water, separating said water and entrainer and vaporizing said entrainer, and re-adding said vapors into the reaction mixture.

4. Process of esterifying an acid catalyzed para-tertiary butylphenol-formaldehyde resin with an unsaturated higher fatty acid which comprises heating the mixture of resin and fatty acid in the presence of an esterification catalyst to a temperature within the approximate range of 200–300° C. adding vapors of an entrainer for the water of reaction into the reaction mixture at a rate of at least 2 cc. (measured as liquid) per minute per 100 grams of resin, said vapors being added at a temperature above the boiling point of said entrainer, withdrawing said vapors with the entrained water of esterification from the reaction vessel, condensing said entrainer and water, separating said water and entrainer and vaporizing said entrainer, and re-adding said vapors into the reaction mixture.

5. Process of esterifying an acid catalyzed alkyl substituted phenol formaldehyde resin in which the alkyl substituent contains from 1–8 carbon atoms, with an unsaturated higher fatty acid which comprises heating the mixture of resin and fatty acid in the presence of an esterification catalyst to a temperature within the approximate range of 200–300° C. adding vapors of an entrainer for the water of reaction into the reaction mixture at a rate of at least 2 cc. (measured as liquid) per minute per 100 grams of resin, said vapors being added at a temperature above the boiling point of said entrainer, withdrawing said vapors with the entrained water of esterification from the reaction vessel, condensing said entrainer and water, separating said water and entrainer and vaporizing said entrainer, and re-adding said vapors into the reaction mixture.

6. Process of esterifying an acid catalyzed alkyl substituted phenol formaldehyde resin in which the alkyl substituent contains from 1–8 carbon atoms, with an unsaturated higher fatty acid which comprises heating a mixture of said resin and said fatty acid to a temperature of 250–300° C. in the presence of a phosphite ester catalyst while adding vapors of an entrainer for the water of reaction into the reaction mixture at a rate of at least 2 cc. (measured as liquid) per minute per 100 grams of resin, said vapors being added at a temperature above the boiling point of said entrainer, withdrawing said vapors with the entrained water of esterification from the reaction vessel, condensing said entrainer and water, separating said water and entrainer and vaporizing said entrainer, and re-adding said vapors into the reaction mixture.

7. Process of esterifying an alkyl substituted acid catalyzed phenol formaldehyde resin in which the alkyl substituent contains from 1–8 carbon atoms with an unsaturated higher fatty acid which comprises heating a mixture of said resins and said fatty acid to a temperature of 250–300° C. in the presence of a phosphite ester catalyst while adding vapors of xylene into the reaction mixture at a rate of at least 2 cc. (measured as liquid) per minute per 100 grams of resin, said vapors being added at a temperature above the boiling point of said xylene, withdrawing said vaporized xylene with the entrained water of esterification from the reaction vessel, condensing said xylene and water, separating said xylene and water and vaporizing said xylene and re-adding said vaporized xylene into the reaction mixture.

References Cited in the file of this patent

UNITED STATES PATENTS

| | | |
|---|---|---|
| 2,057,766 | Brubaker | Oct. 20, 1936 |
| 2,376,104 | Welling | May 15, 1945 |
| 2,562,846 | Reider et al. | July 31, 1951 |
| 2,622,071 | Harrison | Dec. 16, 1952 |